July 19, 1949.  N. V. PILLUS  2,476,382
MOTOR VEHICLE PHOTOELECTRIC CONTROL
SYSTEM FOR HEADLIGHTS
Filed March 26, 1948  2 Sheets-Sheet 1

INVENTOR.
Nicholas V. Pillus
BY
McMorrow, Berman & Davidson
ATTORNEYS

July 19, 1949.    N. V. PILLUS    2,476,382
MOTOR VEHICLE PHOTOELECTRIC CONTROL
SYSTEM FOR HEADLIGHTS
Filed March 26, 1948    2 Sheets-Sheet 2

INVENTOR.
Nicholas V. Pillus

BY
McMorrow, Berman & Davidson
ATTORNEYS

Patented July 19, 1949

2,476,382

UNITED STATES PATENT OFFICE 2,476,382

MOTOR VEHICLE PHOTOELECTRIC CONTROL SYSTEM FOR HEADLIGHTS

Nicholas V. Pillus, East Orange, N. J.

Application March 26, 1948, Serial No. 17,236

3 Claims. (Cl. 315—83)

This invention relates to motor vehicle headlight dimmers and more particularly to an automatic control system for automobile headlight circuits.

A main object of the invention is to provide a novel and improved control apparatus for motor vehicle headlights which functions in response to the headlight beam of an approaching vehicle to automatically dim or depress the headlight beam of the vehicle on which the apparatus is mounted whereby glare is reduced and night driving conditions, especially on narrow roads are made less hazardous.

A further object of the invention is to provide an improved headlight control apparatus of the photo electric type which is simple in construction, easy to install on motor vehicles and which provides a timed dimming of the headlights of a motor vehicle on which the apparatus is mounted commencing with the approach of an oncoming other vehicle, and continuing until said other vehicle has passed a safe distance beyond the first vehicle.

Further objects and advantages of the invention will become apparent from the following description and claims, and from the accompanying drawings, wherein:

Figure 1:
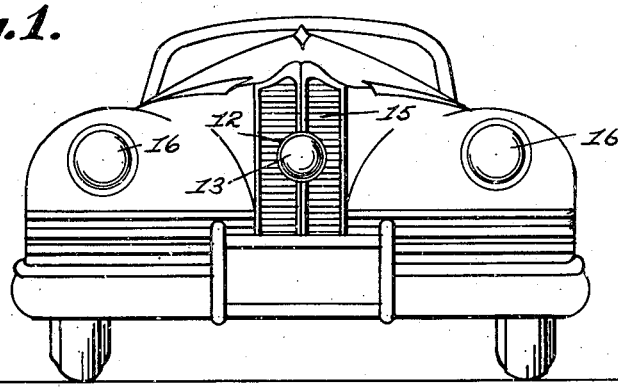
Figure 1 is a front elevational view of a motor vehicle equipped with a headlight control apparatus constructed in accordance with the present invention.
Figure 2:
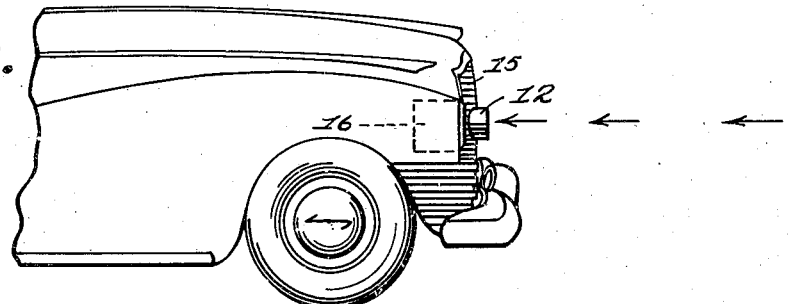
Figure 2 is a side elevational view of the forward portion of the motor vehicle of Figure 1.

Referring to the drawings, 11 designates a housing provided at its forward wall with a cylindrical lens tube 12 in which are mounted suitable lenses 13, 13. Mounted in the housing behind the lenses is a photoelectric cell 14 of the selenium type. The housing 11 is secured to the forward portion of a motor vehicle with the lens tube 12 directed forwardly, as for example in the manner shown in Figures 1 and 2, wherein the housing 11 is secured behind the radiator grille 15 of the vehicle with tube 12 projecting forwardly through the grille, the tube 12 being substantially centered between the vehicle headlights 16, 16.

Mounted in housing 11 in any suitable manner is a relay element designated generally at 17 and comprising an insulating base 18 on which is secured an inverted L-bracket 19. Depending from the top arm of bracket 19 and rigidly secured thereto is a nut member 20 in which is threadedly engaged a pivot screw 21. Secured on base 18 in vertical alignment with nut member 20 is a nut member 22 in which is threadedly engaged an upstanding pivot screw 23. Pivoted between pivot screws 21 and 23 is an armature 24 of non-magnetic metal, such as brass, said armature carrying at one end a solenoid coil 25. The terminals of coil 25 are connected by suitable flexible wires to binding posts 26, 27 mounted on base 18. Forwardly adjacent coil 25, as viewed in Figure 7, is a permanent magnet 28 carried on a vertical post member 29 secured to base 18.

Figure 7:
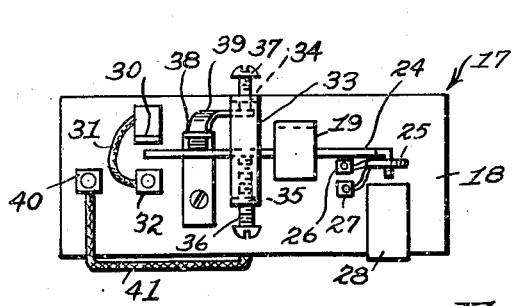
Figure 7 is a top plan view of the relay element of Figure 5.
Figure 9:
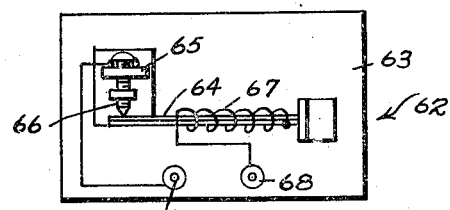
Figure 9 is a plan view of the thermal timing switch of Figure 8.

Rearwardly adjacent the opposite end of armature 24, as viewed in Figure 7, is a vertical metal contact bar 30 secured to base 18. Bar 30 is connected by a wire 31 to a binding post 32 secured to base 18. Designated at 33 is a bracket member secured to base 18 and having vertical arms 34 and 35 positioned on opposite sides of armature 24 between bracket 19 and bar 30. Threaded through arm 35 is a stop screw 36 engageable with armature 24 to limit counter-clockwise rotation thereof, as viewed in Figure 7. Threaded through arm 34 is a screw 37. Secured to base 18 adjacent bracket member 33 is an upstanding bracket 38 in the upper portion of which is pivotally mounted a generally U-shaped leaf spring 39. One arm of leaf spring 39 engages armature 24 and the other arm thereof is engaged by screw 37. Spring 39 therefore biases armature 24 counter-clockwise, as viewed in Figure 7, and the degree of biasing pressure is regulated by the adjustment of screw 37. In its normal position, armature 24 is out of contact with bar 30, as shown in Figure 7. When coil 25 becomes energized, an attractive force is exerted thereon, by magnet 28, causing armature 24 to pivot clockwise against the biasing force of spring 39 and to engage bar 30.

Mounted on base 18 is a binding post 40 connected by a wire 41 to the pivot bracket 19. When coil 25 becomes energized, as above described, the normally open circuit between binding posts 40 and 32 becomes closed by the engagement of armature 24 with bar 30.

Also mounted in housing 11 is a relay designated generally at 41, having a solenoid winding 42 and a plunger 43. Plunger 43 carries an upper conductive arm 44 and a lower conductive arm 45, said arms being suitably insulated from plunger 43. Plunger 43 is biased upwardly by suitable spring means so that upper arm 44 normally engages a pair of contacts 46 and 47 carried by the relay housing. Designated at 48, 49 and 50, 51 are respective pairs of contacts arranged so as to be respectively bridged by arms 44 and 45 when plunger 43 is moved downwardly responsive to the energization of solenoid winding 42.

Figure 3:
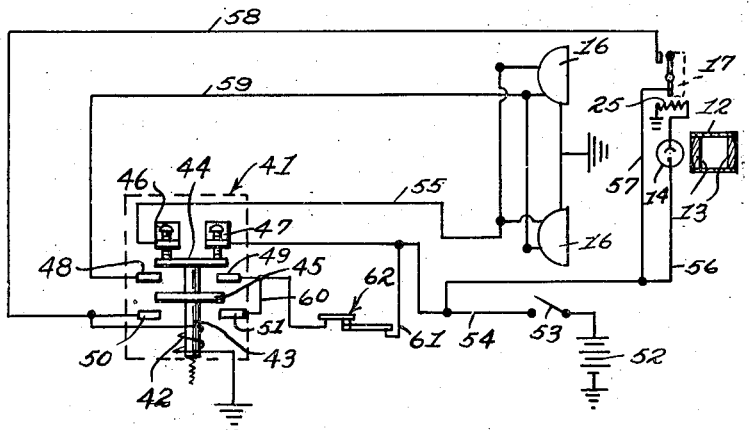
Figure 3 is a wiring diagram of the headlight control apparatus employed in Figure 1.
Figure 4:
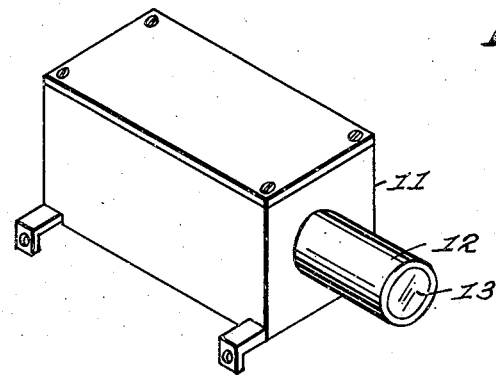
Figure 4 is a perspective detail view of a headlight control unit such as is employed on the vehicle of Figure 1.
Figure 5:
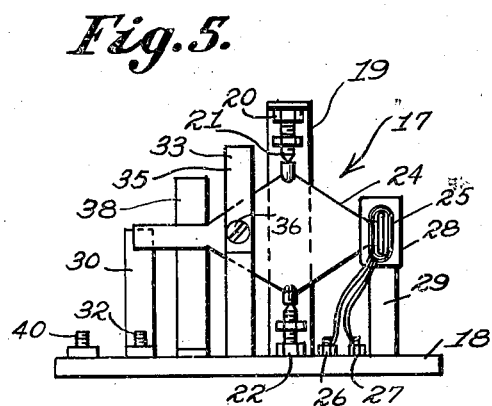
Figure 5 is a side elevational view of a relay element employed in the unit of Figure 4.
Figure 6:
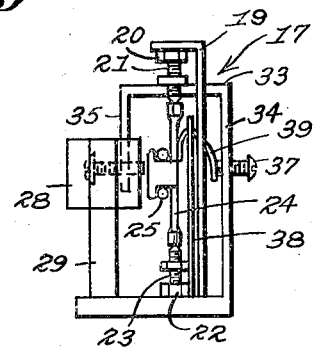
Figure 6 is an end elevational view of the relay element of Figure 5.
Figure 8:
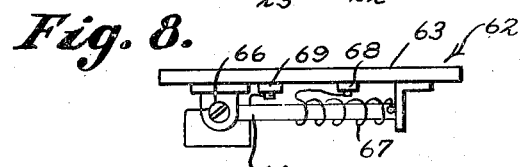
Figure 8 is an elevational view of a thermal timing switch employed in the apparatus illustrated in Figure 3.

Referring now to Figure 3, 52 designates the vehicle battery. One terminal thereof is grounded and the other terminal thereof is connected through a control switch 53 to a wire 54 which is connected to contact 47. Contact 46 is connected by a wire 55 to the center contact terminals of the "high" beam lamp sockets in headlights 16, 16.

One terminal of the relay coil 25 is grounded. The other terminal is connected through the selenium photoelectric cell 14 to a wire 56 which is connected to wire 54. Binding post 40 of the relay 17 is connected by a wire 57 to wire 56. Binding post 32 is connected by a wire 58 to contact 50. One terminal thereof is grounded. Contact 48 is connected by a wire 59 to the center contact terminals of the "low" beam lamp sockets in headlights 16, 16. Contacts 49 and 51 are connected together by a wire 60. Wire 60 is connected to wire 54 by a wire 61 which includes in series therewith a normally closed time delay relay switch 62. Switch 62 comprises an insulating base 63 having mounted thereon a bimetallic arm 64 and a bracket 65 provided with an adjustable contact screw 66 engageable with arm 64. Wound on arm 64 is a heater coil 67, one terminal of which is connected to arm 64. The other terminal of the coil 67 is connected to a binding post 68 mounted on base 63. Contact screw 66 is connected to a second binding post 69 mounted on base 63. Arm 64 normally engages screw 66, but at a predetermined time after heater coil 67 becomes energized the arm deflects away from said screw.

Under normal conditions, cell 14 is substantially non-conducting and there is no energization of solenoid winding 42. Under these conditions when switch 53 is closed, the "high" beam lamps will be energized from battery 52 through switch 53, wire 54, contact 47, arm 44, contact 46 and wire 55. When the light from the headlight beams of an approaching vehicle impinges on the cell 14, said cell becomes conducting and energizes coil 25 from battery 52 through wire 54, wire 56 and cell 14. This causes armature 24 to engage bar 30 and close the contacts of relay 17. Winding 42 becomes energized through wire 58, the closed contacts of relay 17, wire 57, wire 54, closed switch 53, battery 52 and the common ground connections of said battery and solenoid winding 42. Plunger 43 moves downwardly. Arm 45 bridges contacts 50 and 51, closing a holding or latching circuit for solenoid winding 42 comprising wire 61, normally closed time delay switch 62, wire 60, contact 51, arm 45, contact 50, wire 58, the winding of solenoid 42 the common ground connection, battery 52, switch 53 and wire 54.

Arm 44 disengages from contacts 46 and 47, de-energizing the "high" beam lamps and bridges contacts 48 and 49, energizing the low beam lamps through a circuit comprising battery 52, wire 54, wire 61, closed switch 62, contact 49, arm 44, contact 48 and wire 59. After a time period sufficient for the vehicles to pass each other, switch 62 opens and breaks the holding circuit for solenoid winding 42 as well as the energizing circuit for the "low" beam lamps. Plunger 43 returns to its normal position, causing the "high" beam lamps to be again energized.

If both vehicles are equipped with control apparatus as above described, then "high" beam lamps will be automatically extinguished and their "low" beam or "dim" lamps will be energized during the period required for the vehicles to pass each other, whereby glare hazards are greatly reduced to both drivers during the critical passing period.

While a specific embodiment of an automatic headlight control apparatus for motor vehicles has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a vehicle head lamp system including a head lamp having a "bright" and a "dim" filament, a source of electrical energy, means including a manually-operated switch connecting said source of electrical energy with said headlight filaments, a relay switch in said connecting means operative to selectively shift the connection between said source of electrical energy and said filaments from one of such filaments to the other, and light-responsive means connected to said relay switch to operate said relay switch to connect the "dim" filament with the source of electrical energy when said light-responsive device is subjected to light from an approaching vehicle, means operated by said relay to electrically latch said relay switch in condition connecting said source of electrical energy with said "dim" filament, a time delay relay connected in series with said relay latching means to release said latching means after a predetermined time interval, and resilient means connected to said relay to return said relay switch to condition connecting the source of electrical energy to the "bright" filament when said latching means is released.

2. A vehicle head lamp system comprising a head lamp having a "bright" filament and a "dim" filament, a source of electrical energy, means including a manually-operated switch connecting said source of electrical energy with said filaments, a relay in said connecting means operative to selectively connect said source of electrical energy to either said "bright" filament or said "dim" filament, light-responsive means connected to said relay to condition said relay to connect said source of electrical energy to said "dim" filament when said light-responsive means is subjected to light from an approaching vehicle, relay latching means operated by said relay to electrically latch said relay in condition connecting said source of electrical energy to said "dim" filament, a time-delay relay connected in series with said latching means to release said latching means after a predetermined time interval, and resilient means connected to said relay to condition said relay to connect said source of electrical energy to said "bright" filament when said relay-latching means is released.

3. A vehicle head lamp system comprising a head lamp having a "bright" filament and a "dim" filament, a source of electrical energy, means including a manually-operated switch electrically connecting said source of electrical energy to said filaments, a relay in said connecting means normally connecting said source of energy to said "bright" filament but operative to connect said source of energy to said "dim" filament, light-responsive means connected to said relay to operate said relay to disconnect said source of electrical energy from said "bright" filament and connect the latter to said "dim" filament when said light-responsive means is subjected to light from an approaching vehicle, means operated by said relay electrically latching said relay in condition to connect said source of electrical energy to said "dim" filament, and time-delay relay means connected in series with said relay-latching means to release said latching means after a predetermined time interval.

NICHOLAS V. PILLUS.

REFERENCES CITED

The following references are of record in the file of this patent:

UNITED STATES PATENTS

| Number | Name | Date |
|---|---|---|
| 2,086,765 | Gustafson | July 13, 1937 |
| 2,150,900 | Alley | Mar. 21, 1939 |
| 2,219,976 | Berg, Jr. | Oct. 29, 1940 |
| 2,240,843 | Gillespie | May 6, 1941 |
| 2,375,677 | Moore | May 8, 1945 |